2,831,824

GELLED VINYL CHLORIDE POLYMER PLASTISOLS AND METHOD OF MAKING SAME

William H. White, Elkhart, Ind., assignor to United States Rubber Company, New York, N. Y., a corporation of New Jersey No Drawing. Application April 26, 1955
Serial No. 504,111

8 Claims. (Cl. 260—30.6)

This invention relates to controlling the flow properties of plastisols by which term I mean plastisols free from diluent as well as modified plastisols containing a small amount of diluent. More particularly it relates to so controlling the rheological properties of plastisols that they have a definite yield point coupled with relatively low viscosity at high shear and relatively high viscosity at low shear. For certain kinds of coating operations, in particular those wherein a vinyl resin plastisol is applied to a fabric with a reverse roll coating machine, it is essential that the plastisol coating composition have the properties just specified. The flow properties of plastisols are also important, although to a lesser extent, in other coating operations, such as knife coating.

The principal object of the present invention is to provide a simple and highly effective method of controlling the flow properties of plastisols, especially plastisols which are to be used in reverse roll coating machines. Another object is to provide a simple means for imparting to plastisols low viscosity at high shear and high viscosity at low shear. Other objects of my invention will more fully appear hereinafter.

I have discovered that the flow properties of plastisols can be readily regulated by forming a uniform mixture of from 5 to 50% of an aqueous paste containing a penta alkali-metal pentaalkyl tripolyphosphate having the formula $M_5R_5(P_3O_{10})_2$ where R is an alkyl radical having from 6 to 10 carbon atoms and M is an alkali-metal, especially sodium or potassium, and from 95 to 50% of a high-boiling organic liquid monomeric plasticizer which is an alkyl, alkoxyalkyl or cycloalkyl ester formed by esterifying a saturated aliphatic or alicyclic alcohol (i. e., either an alkanol, an alkoxyalkanol or a cycloalkanol) or a mixture of two or more such alcohols with a dibasic or tribasic organic carboxylic acid free from olefinic and acetylenic unsaturation or with phosphoric acid, heating this mixture until substantially all of the water contained therein has been removed, cooling this mixture to a relatively low temperature, say below 100° F., and thereby converting it to a gelled mixture and intimately commingling a minor proportion of the cooled mixture with a major proportion of the plastisol whose flow characteristics are to be regulated.

The resulting plastisol is then applied to its intended use. Thus it may be applied to a fabric with a reverse roll coater after which it is heated to fuse the plastisol. Alternatively, it may be applied by a reverse roll coater to a suitable carrier surface followed by applying a suitable textile fabric to the plastisol layer thus laid down, heating to fuse the plastisol layer, and stripping of the fabric-resin laminate from the carrier.

The liquid plasticizer with which the paste is admixed should be free from olefinic and acetylenic unsaturation for the reason that it is undesirable to use plasticizers containing olefinic or acetylenic bonds with vinyl resins because of heat breakdown. Although plasticizers containing such unsaturation might be operative, their use would not be practical.

By proceeding in accordance with my invention, good regulation of the flow characteristics of the plastisol is achieved whereas simple addition of the penta alkali-metal pentaalkyl tripolyphosphate as a water paste directly to the plastisol is not only inoperative but actually in most cases produces an effect opposite to that desired, i. e. lowers the yield point instead of raising it.

The uniqueness of my invention is further indicated by the fact that if the aqueous paste of the tripolyphosphate (this material being supplied commercially as a paste) is dried and the dried tripolyphosphate is added directly to the plastisol, a slight beneficial effect is achieved but this effect does not begin to approach in magnitude that produced when the paste is admixed with a high-boiling organic liquid plasticizer, the resulting mixture converted to a gel by removal of water and cooling, and this gel admixed with the plastisol in accordance with my invention. Furthermore, it is extremely difficult to preserve the dried tripolyphosphate since it is very hygroscopic.

In addition to effecting the desired regulation of the flow properties of the plastisol, my invention is advantageous because the penta alkali-metal penta-alkyl tripolyphosphate is available and effective in the final product, i. e. the final coating, as a stabilizer to stabilize the vinyl resin against deterioration upon exposure to light or heat, as is disclosed in U. S. patent to Huff et al. 2,499,503. Thus it performs a dual role.

In practicing my invention, I prefer to use the penta alkali-metal pentaalkyl tripolyphosphate in the form of the proprietary material sold under the name "Stabilizer 85" by Victor Chemical Works of Chicago, Illinois. This material is supplied by the manufacturer in the form of an aqueous paste containing approximately 30% of water and approximately 70% of penta sodium pentaalkyl tripolyphosphate having the formula $Na_5R_5(P_3O_{10})_2$ wherein R represents the $C_6$, $C_8$ and $C_{10}$ alkyl radicals corresponding to the alcohols obtained upon catalytic hydrogenation of the fatty acids contained in cocoanut oil. I understand that such a penta alkali-metal pentaalkyl tripolyphosphate is prepared commercially by reacting the low molecular weight ($C_6$, $C_8$ and $C_{10}$) alcohols obtained by hydrogenating cocoanut oil fatty acids with the appropriate phosphoric anhydride, neutralizing with sodium hydroxide and converting the resulting mixture to paste form. A typical analysis of cocoanut oil indicates the following proportions of combined fatty acids below $C_{12}$:

$C_6$ equals 2.72%
$C_8$ equals 59.16%
$C_{10}$ equals 38.08%

It will be seen that when such a mixture of alcohols is used to form the tripolyphosphate, R will be represented by a major proportion (59%) of octyl, a lesser proportion (38%) of decyl and a still lesser proportion (approximately 3%) of hexyl.

Instead of using the aforementioned "Stabilizer 85," I can use other penta alkali-metal pentaalkyl tripolyphosphates such as those penta sodium pentaalkyl tripolyphosphates which are sold under the names "Victawet 35B" in which R is 2-ethylhexyl and "Victawet 58B" wherein R is capryl. However, because the alcohols used in forming these tripolyphosphates are more expensive than the mixture of $C_6$ to $C_{10}$ alcohols formed by hydrogenating cocoanut oil fatty acids, I prefer to use the aforementioned "Stabilizer 85."

I utilize the penta alkali-metal pentaalkyl tripolyphosphate in the form of the aqueous paste as received from the manufacturer. This paste usually contains the salt in approximately a 70% concentration. This concentration may vary somewhat but is invariably above 50%.

I can prepare the gelled material by simply heating the mixture of the aqueous tripolyphosphate paste and the high-boiling liquid plasticizer at any suitable temperature at which water is driven off. Typically I heat the mixture at the boiling point at atmospheric pressure, allowing the evolved water to be simply boiled off into the atmosphere. At atmospheric pressure the water boils off at temperatures ranging from 212° F. to about 236 F. as a maximum. Alternatively I can heat the mixture of the paste and the plasticizer at a somewhat lower temperature, particularly if the mixture is held under vacuum, the temperature under such conditions ranging downwardly to as low as 180° F., and still obtain the desired removal of water. Alternatively I may heat at greater than atmospheric pressure; under super-atmospheric pressure the temperature of the mixture may reach a value as high as 300° F. The temperature should not be so high as to cause thermal decomposition of the components of the mixture. In the preferred practice of my invention, the mixture is held at the boiling point, at atmospheric pressure, until essentially all of the water is evolved. The use of atmospheric pressure in the heating step is preferable to the use of sub- or super-atmospheric pressure because of greater simplicity.

As the last portion of the water is evolved the mixture is converted into such form that although it is liquid at elevated temperatures, it becomes a gel upon cooling to temperatures in the neighborhood of room temperature, e. g. 70–100° F.

I am unable to explain with certainty why the formation and use of the gelled mixture produces my results, but regardless of the mechanism it is a fact that the gelled mixture provides a remarkably effective means of controlling the rheological properties of plastisols.

In practicing my invention I remove substantially all of the water contained in the tripolyphosphate-plasticizer mixture. By "substantially all" I mean approximately 97% or more. I prefer to remove essentially all of the water because I find that the presence of water in the gelled mixture reduces its effectiveness in imparting the desired rheological properties to the plastisol.

I believe that the removed water is the water which was in the tripolyphosphate paste. The evidence indicates that no chemical reaction between the tripolyphosphate and plasticizer takes place, but I do not wish to be limited by any theoretical considerations in this connection.

I find it practically essential to have anti-foaming agents of any suitable type and amount present in the mixture during the step of removing the water, in order to suppress objectionable foaming of the mixtures. Examples of suitable anti-foaming agents are high boiling alcohols such as the $C_8$ and higher alkanols, such as octanol-2 and 2-ethylhexanol, and the known silicone anti-foamers, e. g., liquid polymeric dihydrocarbon silicones, especially a di-lower alkyl silicone like dimethyl silicone. Silicone liquids suitable for this purpose are illustrated in U. S. Patents Nos. 2,375,007; 2,416,503 and 2,416,504. An example of such a silicone liquid is that known as "DC Anti-Foam A." On the use of silicone anti-foaming agents, see pages 87–90 of "Silicones and Their Uses," by McGregor, published by McGraw-Hill, 1954. The selection of a suitable type and amount of anti-foaming agent are within the skill of the art. The amount of the anti-foamer can be extremely small so that no problem of objectionable contamination of the plastisol and of the final product by the anti-foamer is evolved.

In practicing my invention I prefer to employ an amount of the aqueous tripolyphosphate paste equal to from 20 to 30% by weight based on the sum of the paste and the plasticizer heated to form the gelled mixture. The actual percentages employed will vary from plasticizer to plasticizer. Those skilled in the art will be readily able to obtain my results by following my disclosure.

For many purposes the amount of the gelled mixture commingled with the plastisol to regulate its flow properties is equal to from 7.5% to 15% by weight based on the weight of the plastisol. However it can be as little as 5% or as much as 40%. The use of more or less of the gelled tripolyphosphate-plasticizer mixture in the plastisol will, of course, affect the flow properties of the plastisol and they can thus be regulated as desired.

The plasticizer with which the tripolyphosphate is heated to form the gelled mixture can be any alkyl, alkoxyalkyl or cycloalkyl di-ester of a dibasic organic acid or tri-ester of a tribasic organic acid or tri-ester of phosphoric acid. The plasticizer should be free from olefinic and acetylenic unsaturation. The acid will usually be an aromatic or a saturated aliphatic di- or tri-carboxylic acid or phosphoric acid. The alcohol with which the acid is esterified will usually be either a saturated aliphatic alcohol (alkanol) or a saturated cycloaliphatic monohydric alcohol (saturated alicyclic alcohol) furnishing alkyl or cycloalkyl groups, respectively. Instead of alkyl (formed from an alkanol) I may use an alkoxyalkyl (e. g. butoxyethyl) which is formed from an alkoxyalkanol. Mixtures of two or more of these types of hydroxyl-bearing esterifying compounds can be used, resulting in a mixed ester. Examples of ester-type plasticizers suitable for use in the gel-forming step of my invention are: dioctyl phthalate, diisooctyl phthalate, dicyclohexyl phthalate, dibutoxyethyl phthalate, octyl decyl phthalate, and similar di-esters of saturated aliphatic dicarboxylic acids such as adipic, sebacic, succinic and azelaic acids; and similar tri-esters of phosphoric acid, for example tri-octyl phosphate. Instead of using a single plasticizer, a mixture of two or more may be used. For some reason, polymeric plasticizers such as polyesters are not sufficiently effective to warrant their use in this step of my invention. For example, a certain commercially available polyester plasticizer does not give a gel when heated with the tripolyphosphate paste to a temperature of 250° F. and gives only a very light gel when the temperature is raised to 375° F. after the water has been driven off. This light gel, when admixed with the plastisol, is substantially ineffective for the purposes of my invention.

The phosphate type plasticizers formed by esterifying phosphoric acid with the aromatic alcohols and phenols, e. g. tricresyl phosphate, cresyl diphenyl phosphate, do not give satisfactory results when admixed with the tripolyphosphate paste and processed in accordance with my invention. Similarly the esters formed by esterifying the dibasic and tribasic organic acids with aromatic alcohols and phenols, e. g., butyl benzyl phthalate, are not suitable for use in my invention. Examples of other high-boiling organic liquid plasticizers which are not satisfactory for use in the practice of my invention are: ortho-nitrobiphenyl, partially hydrogenated isomeric terphenyls (e. g., "HB-40") and butyl benzoate.

In practicing my invention, the cooled gelled tripolyphosphate-plasticizer mixture is uniformly admixed with any of the conventional types of vinyl resin plastisols or with modified plastisols, i. e., plastisols containing up to 10% by weight of an organic thinner or diluent such as naphtha, this percentage being based on the sum of the resin and the plasticizer in admixture therewith. Plastisols, as is well known, are simply mixtures of a particulate thermoplastic vinyl resin, such as polyvinyl chloride or a resinous copolymer of a major proportion of vinyl chloride and a minor proportion of a copolymerizable monomer such as vinyl acetate, and high-boiling organic liquid plasticizer which is substantially a non-solvent for the particulate resin at ordinary temperatures but is capable of dissolving the resin at elevated temperature to form a single phase material which upon cooling to ordinary temperature is a solid material having good physical properties. For further information on plastisols, reference is made to the article "A new technique in coatings," by G. M. Howell et al. in "Official Digest,"

published by the Federation of Paint and Varnish Production Clubs, issue #263, December 1946; the article "Plastisols and organosols," by E. G. Partridge et al. in Rubber Age, volume 67, pages 553–560 (August 1950); the article "Compounding plastisols for specific applications," by Clark et al. in Rubber Age, volume 72, pages 343–349 (December 1952); and pages 170–186 of the book "The Technology of Solvents and Plasticizers," by A. K. Doolittle, published 1954 by Wiley. My invention is applicable to any of the ordinary plastisols, the flow of rheological properties of which are to be controlled. The constitution of the plastisol constitutes no part of the present invention. The plastisol will usually consist of the particulate vinyl resin and from 50 to 150 parts (per 100 parts of resin) of high-boiling organic liquid plasticizer, together with small amounts of stabilizers, pigments, etc. As already indicated, the plastisol can be used in admixture with up to 10 parts of a volatile organic diluent (which does not render the liquid phase capable of dissolving the resin at room temperature) per 100 parts of resin and plasticizer. The plasticizer component of the plastisol is not limited to those described above as being operable in making the gelled mixture.

The tripolyphosphate paste used in making the gelled mixture usually contains approximately 70% by weight of tripolyphosphate, the balance being water. I am not restricted to the use of pastes containing these exact proportions of tripolyphosphate and water but can use pastes containing a major proportion of the salt and a minor proportion of water.

*Example*

A gelled mixture is formed by heating a mixture of 3 parts of the above-described "Stabilizer 85" and 12 parts of dioctyl (di-2-ethylhexyl) phthalate at atmospheric pressure until all of the water has been driven off. The resulting mixture is allowed to cool to 100° F. Approximately 8% by weight of this gelled mixture is then added to a conventional plastisol mixture used in a reverse roll coating operation. The resulting mixture has the following formulation:

| | Parts |
|---|---|
| Polyvinyl chloride ("Geon 121") | 100 |
| Di-2-ethylhexyl phthalate | 54.6 |
| Titanium dioxide | 10 |
| Gelled mixture | 14.1 |

The incorporation of the gelled mixture imparts to the plastisol a definite yield point and rheological properties such that it has a low viscosity at high shear and a high viscosity at low shear. The resulting plastisol mixture has a viscosity of 116,000 centipoises as measured on a Brookfield viscometer at 0.3 R. P. M. with a #4 spindle and a Severs rheometer viscosity (60 p. s. i., nozzle 0.3828 cm. diam., 5 cm. length) of 18,650 centipoises. A layer of the plastisol is applied to a fabric by a reverse roll coating machine after which the plastisol layer is fused into a tough leathery film.

For purposes of comparison, a plastisol mixture having the following formulation is prepared:

| | Parts |
|---|---|
| "Geon 121" | 100 |
| Di-2-ethylhexyl phthalate | 66.6 |
| Titanium dioxide | 10 |
| "Stabilizer 85" | 3 |

The relative proportions of vinyl resin, di-2-ethylhexyl phthalate, pigment and "Stabilizer 85" used in this comparative formulation are identical with those used in the first formulation. However the "Stabilizer 85" is not heated with a portion of the di-2-ethylhexyl phthalate prior to incorporation with the plastisol. This comparative formulation has a Brookfield viscosity of 20,000 centipoises and a Severs viscosity of 19,800 centipoises. The magnitude of the difference achieved by forming a gelled mixture of 12 parts of the plasticizer and 3 parts of "Stabilizer 85" in accordance with my invention is readily apparent.

The plastisol compositions made in accordance with my invention can be applied by any suitable coating apparatus to a conventional plastisol casting surface after which the plastisol can be fused in the usual way whereby upon cooling there is obtained a tough leathery film. My plastisol compositions are especially useful in practicing the invention of copending application of Burnett and Hickery, Serial No. 474,492, filed December 10, 1954, which is hereby expressly incorporated herein by reference. In accordance with said application a film of the vinyl resin dispersion having a low viscosity at high shear and a high viscosity at low shear is cast from a reverse roll coater on a casting surface, a textile fabric is applied to the exposed surface of the wet film, and the resulting assembly is heated to fuse the film after which the fabric-backed film is stripped from the casting surface. For this use, the dispersion preferably has a viscosity less than 14,000 centipoises when measured on the Severs rheometer and should be such that it will require at least 2 minutes for a descent of 4 inches by a number 1 disc under a weight of 134.8 grams in a Gardner mobilometer and preferably such that it requires at least 1 minute for such a descent. The latter measurement is a measure of the yield point of the material. Following is an example of a method of making a material having such properties:

| | Parts |
|---|---|
| "Geon 121" | 100 |
| Di-capryl phthalate | 70 |
| Titanium dioxide | 10 |
| "Stabilizer 85" | 5 |

The 5 parts of "Stabilizer 85" are commingled with 45 parts of the di-capryl phthalate and this mixture is heated at atmospheric pressure until all of the water is removed. The resulting mixture is cooled down and this gel is admixed uniformly with a plastisol made from the resin, the rest of the di-capryl phthalate and the titanium dioxide. The resulting coating material has a viscosity of 6,600 centipoises at 60 lbs. per square inch shear in the Severs rheometer and required 1.36 minutes for a four inch descent of the Gardner #1 disc. When applied to fabric in the manner described in the aforementioned application, it gives outstanding results.

The great value of my invention resides in the high yield point property which exists in the plastisol after it has been spread in the coating operation, said high yield point preventing undesirable flow, distortion and capillary action effects, which occur in systems not having high yield points prior to the immobility imparted by fusion. Ordinarily, during the interim between spreading and the absorption of enough heat to cause fushion the temperature increase would cause a lowering of viscosity sufficient to cause undersirable effects on the coating. The high yield point of my composition precludes this occurrence. This, it is insured that the plastisol layer maintains the shape and dimensions, imparted to it in the applying step, and thence throughout the heating step wherein it is ultimately fused. As a result, it is possible and practical to employ a single pass applying step, laying down only a single coating of greater than heretofore attainable thickness of a plastisol in the process of the above mentioned application wherein the plastisol layer while on a carrier has the textile fabric backing layer applied over it and is subsequently fused by heating while the plastisol layer is maintained in direct contact with, and in fact partially penetrates, the textile fabric layer. In this way, the practice of my invention effects tremendous economies in the manufacture of fabric-backed plasticized vinyl sheeting by eliminating the necessity for a multi-pass operation.

The application of thick coatings of plastisols having low yield point after spreading in accordance with prior techniques would cause undersirable penetration, capillary action, and distortion, making it necessary to apply several thin coats which could be rapidly heated and thus immobilized before penetration of the initial coat became too serious. The new material of my invention with high yield point obviates such difficulties even though a relatively thick coating is applied in one pass.

All proportions and percentages mentioned herein are by weight.

The item "plastisol," as used in the claims is intended to include both diluent-free plastisols and modified plastisols containing up to 10% of diluent.

From the foregoing description, it will be seen that the present invention provides a simple, convenient and economically feasible method of controlling the flow properties of plastisols. As previously indicated, an additional advantage of the invention is that the tripolyphosphate used in forming the gelled mixture is also available in the final product to stabilize the vinyl resin derived from the plastisol against the action of heat and light. Numerous other advantages of my invention will be obvious to those skilled in the art.

In many situations the use of high viscosity plastisol coating compositions which do not possess the desirable thixotropic properties imparted by the practice of my invention would put such a burden upon existing applying equipment that extensive revision thereof would be necessary to produce thick coatings in a one-pass operation. The present invention enables one to use "light" motors and frames which results in considerable reductions in capital expenditure and energy expenditure in addition to eliminating the damage usually associated with handling materials when they must be re-run several times as would be the case if multiple application were required to build up a coating of the desired thickness.

Having thus described my invention, what I claim and desire to protect by Letters Patent is:

1. The method of regulating the flow properties of a plastisol which comprises forming a uniform mixture of from 5 to 50% of an aqueous paste containing a penta alkali-metal pentaalkyl tripolyphosphate having the formula $M_5R_5(P_3O_{10})_2$ where R is an alkyl radical having from 6 to 10 carbon atoms and M is an alkali-metal, and from 95 to 50% of a high-boiling organic liquid monomeric plasticizer selected from the group consisting of di- and tri-esters of alkanols, alkoxyalkanols and cycloalkanols, and mixtures thereof, with di- and tri-basic carboxylic acids free from olefinic and acetylenic unsaturation and with phosphoric acid, said percentages being by weight based on the sum of said paste and said plasticizer, heating said mixture until substantially all of the water contained therein has been evolved, converting the resulting mixture to a gelled mixture by cooling and intimately commingling from 5% to 40% by weight (based on the weight of the hereinafter mentioned plastisol) of the resulting gelled mixture with a plastisol, the said plastisol comprising 100 parts of particulate thermoplastic vinyl chloride resin and from 50 to 150 parts of a high boiling organic liquid plasticizer which is substantially a non-solvent for the particulate resin at ordinary temperatures but is capable of dissolving the resin at elevated temperature to form a single phase material which upon cooling to ordinary temperature is a solid material.

2. The method of claim 1 wherein the amount of said aqueous paste is equal to from 20 to 30% by weight based on the sum of said paste and said plasticizer which is mixed with said paste and wherein the amount of said gelled material commingled with said plastisol is equal to from 7½ to 15% by weight based on the weight of said plastisol.

3. The method of regulating the flow properties of a plastisol which comprises forming a uniform mixture from 5 to 50% of an aqueous paste containing a penta alkali-metal pentaalkyl tripolyphosphate having the formula $M_5R_5(P_3O_{10})_2$ where R represents the $C_6$, $C_8$ and $C_{10}$ alkyl radicals of the alcohols obtained upon hydrogenating cocoanut oil fatty acids and from 95 to 50% of dioctyl phthalate, said percentages being by weight based on the sum of said paste and said phthalate, heating said mixture until substantially all of the water contained therein has been evolved, converting the resulting mixture to a gelled mixture by cooling, and intimately commingling the resulting gelled mixture with a plastisol, the amount of said gelled mixture commingled with said plastisol being equal to from 7½ to 15% by weight based on the weight of said plastisol, the said plastisol comprising 100 parts of particulate thermoplastic vinyl chloride resin and from 50 to 150 parts of a high boiling organic liquid plasticizer which is substantially a non-solvent for the particulate resin at ordinary temperatures but is capable of dissolving the resin at elevated temperature to form a single phase material which upon cooling to ordinary temperature is a solid material.

4. The method of regulating the flow properties of a plastisol which comprises forming a uniform mixture of approximately 20% of an aqueous paste containing approximately 70% of a penta sodium pentaalkyl tripolyphosphate having the formula $Na_5R_5(P_3O_{10})_2$ where R represents the $C_6$, $C_8$ and $C_{10}$ alkyl radicals of the alcohols obtained upon hydrogenating cocoanut oil fatty acids and approximately 80% of dioctyl phthalate, said percentage being by weight based on the sum of said paste and said phthalate, heating said mixture until substantially all of the water contained therein has been evolved, converting the resulting mixture to a gelled mixture by cooling, and intimately commingling the resulting gelled mixture with a plastisol, the amount of said gelled mixture commingled with said plastisol being equal to approximately 8% by weight based on the weight of said plastisol, the said plastisol comprising 100 parts of particulate thermoplastic vinyl chloride resin and from 50 to 150 parts of a high boiling organic liquid plasticizer which is substantially a non-solvent for the particulate resin at ordinary temperatures but is capable of dissolving the resin at elevated temperature to form a single phase material which upon cooling to ordinary temperature is a solid material.

5. A composition of matter comprising a uniform mixture of (A) a plastisol and (B) from 5% to 40%, based on the weight of said plastisol, of a gelled mixture formed by removal of substantially all of the water from a mixture of from 5 to 50% of an aqueous paste containing a penta alkali-metal pentaalkyl tripolyphosphate having the formula $M_5R_5(P_3O_{10})_2$ where R is an alkyl radical having from 6 to 10 carbon atoms and M is an alkali-metal, and from 95 to 50% of a high-boiling, organic liquid monomeric plasticizer selected from the group consisting of di- and tri-esters of alkanols, alkoxyalkanols and cycloalkanols, and mixtures thereof, with di- and tri-basic carboxylic acids free from olefinic and acetylenic unsaturation and with phosphoric acid, said percentages being by weight based on the sum of said paste and said plasticizer, the said plastisol comprising 100 parts of particulate thermoplastic vinyl chloride resin and from 50 to 150 parts of a high boiling organic liquid plasticizer which is substantially a non-solvent for the particulate resin at ordinary temperatures but is capable of dissolving the resin at elevated temperature to form a single phase material which upon cooling to ordinary temperature is a solid material.

6. A composition of matter comprising a uniform mixture of (A) a plastisol and (B) from 7½ to 15% by weight, based on the weight of said plastisol, of a gelled mixture formed by removal of substantially all of the water from a mixture of an aqueous paste containing a penta alkali-metal pentaalkyl tripolyphosphate having the formula $M_5R_5(P_3O_{10})_2$ where R is an alkyl radical having from 6 to 10 carbon atoms and M is an alkali-metal, and a high-boiling organic liquid monomeric plasticizer selected from the group consisting of di- and tri-esters of alkanols, alkoxyalkanols and cycloalkanols, and mixtures thereof, with di- and tri-basic carboxylic acids free from olefinic and acetylenic unsaturation and with phosphoric acid, the amount of said aqueous paste being equal to from 20 to 30% by weight based on the sum of said paste and said plasticizer, the said plastisol comprising 100 parts of particulate thermoplastic vinyl chloride resin and from 50 to 150 parts of a high boiling organic liquid plasticizer which is substantially a non-solvent for the particulate resin at ordinary temperatures but is capable of dissolving the resin at elevated temperature to form a single phase material which upon cooling to ordinary temperature is a solid material.

7. A composition of matter comprising a uniform mixture of (A) a plastisol and (B) from 7½ to 15%, based on the weight of said plastisol, of a gelled mixture formed by removal of substantially all of the water from a mixture of an aqueous paste containing a penta alkali-metal pentaalkyl tripolyphosphate having the formula $$M_5R_5(P_3O_{10})_2$$

where R represents the $C_6$, $C_8$ and $C_{10}$ alkyl radicals of the alcohols obtained upon hydrogenating cocoanut oil fatty acids, and dioctyl phthalate, the amount of said aqueous paste being equal to from 20 to 30% by weight based on the sum of said paste and said dioctyl phthalate, the said plastisol comprising 100 parts of particulate thermoplastic vinyl chloride resin and from 50 to 150 parts of a high boiling organic liquid plasticizer which is substantially a non-solvent for the particulate resin at ordinary temperatures but is capable of dissolving the resin at elevated temperature to form a single phase material which upon cooling to ordinary temperature is a solid material.

8. A composition of matter comprising a uniform mixture of (A) a plastisol and (B) approximately 8% by weight based on the weight of said plastisol of a gelled mixture formed by removal of substantially all of the water from a mixture of approximately 20% of an aqueous paste containing approximately 30% of water and approximately 70% of a penta sodium pentaalkyl tripolyphosphate having the formula $Na_5R_5(P_3O_{10})_2$ where R represents the $C_6$, $C_8$ and $C_{10}$ alkyl radicals of the alcohols obtained upon hydrogenating cocoanut oil fatty acids, and approximately 80% of dioctyl phthalate, the said plastisol comprising 100 parts of particulate thermoplastic vinyl chloride resin and from 50 to 150 parts of a high boiling organic liquid plasticizer which is substantially a non-solvent for the particulate resin at ordinary temperatures but is capable of dissolving the resin at elevated temperature to form a single phase material which upon cooling to ordinary temperature is a solid material.

References Cited in the file of this patent

Rubber Age, volume 67, No. 5, August 1950, pages 553–560.